July 7, 1936.  C. F. EATON  2,046,872

MARKING MACHINE

Filed Jan. 6, 1934  8 Sheets-Sheet 1

Inventor=
Charles F. Eaton,
by Roberts, Cushman & Woodbury
his Attorneys.

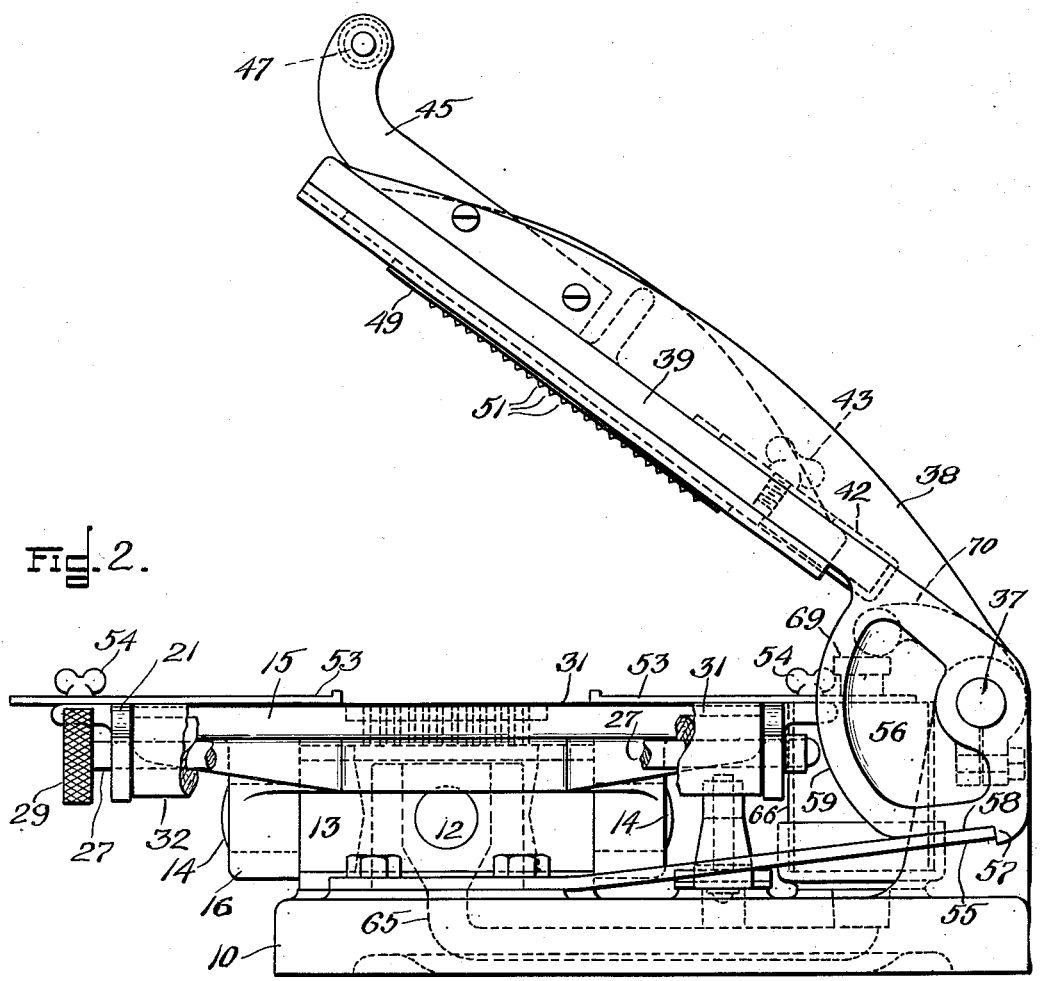

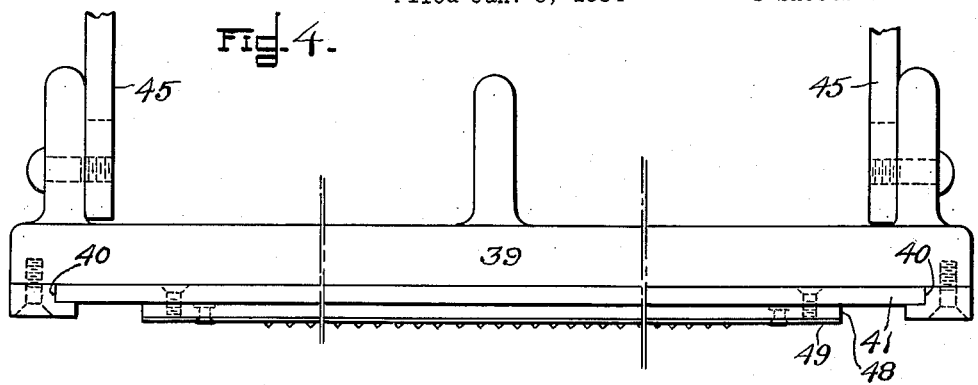
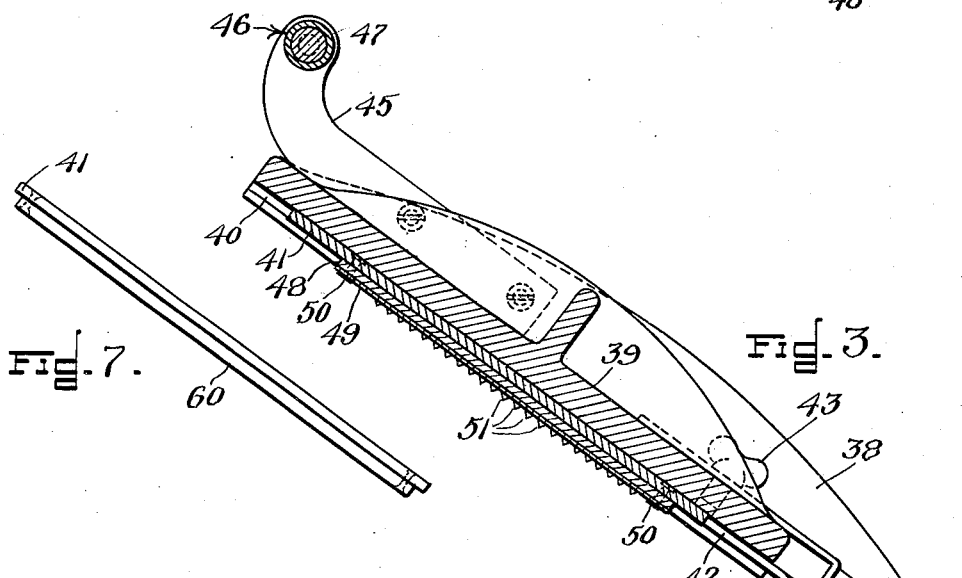
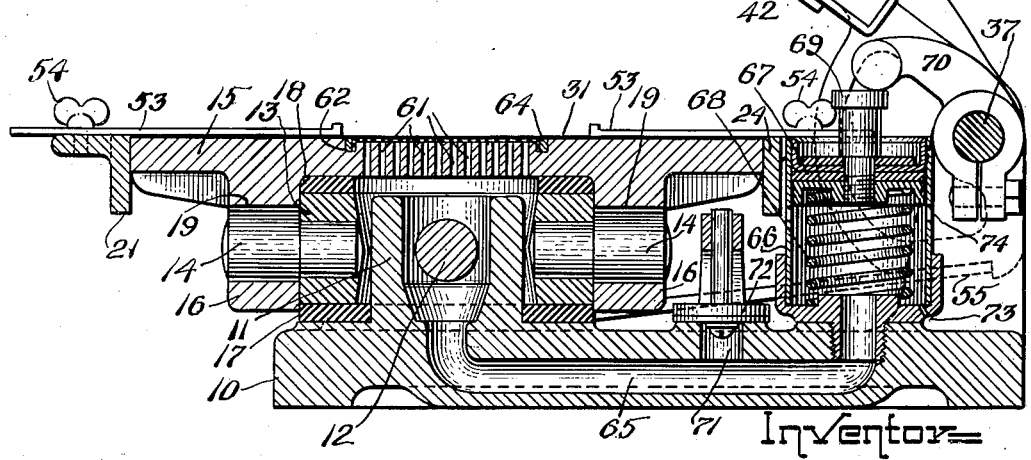

July 7, 1936.  C. F. EATON  2,046,872
MARKING MACHINE
Filed Jan. 6, 1934  8 Sheets-Sheet 4
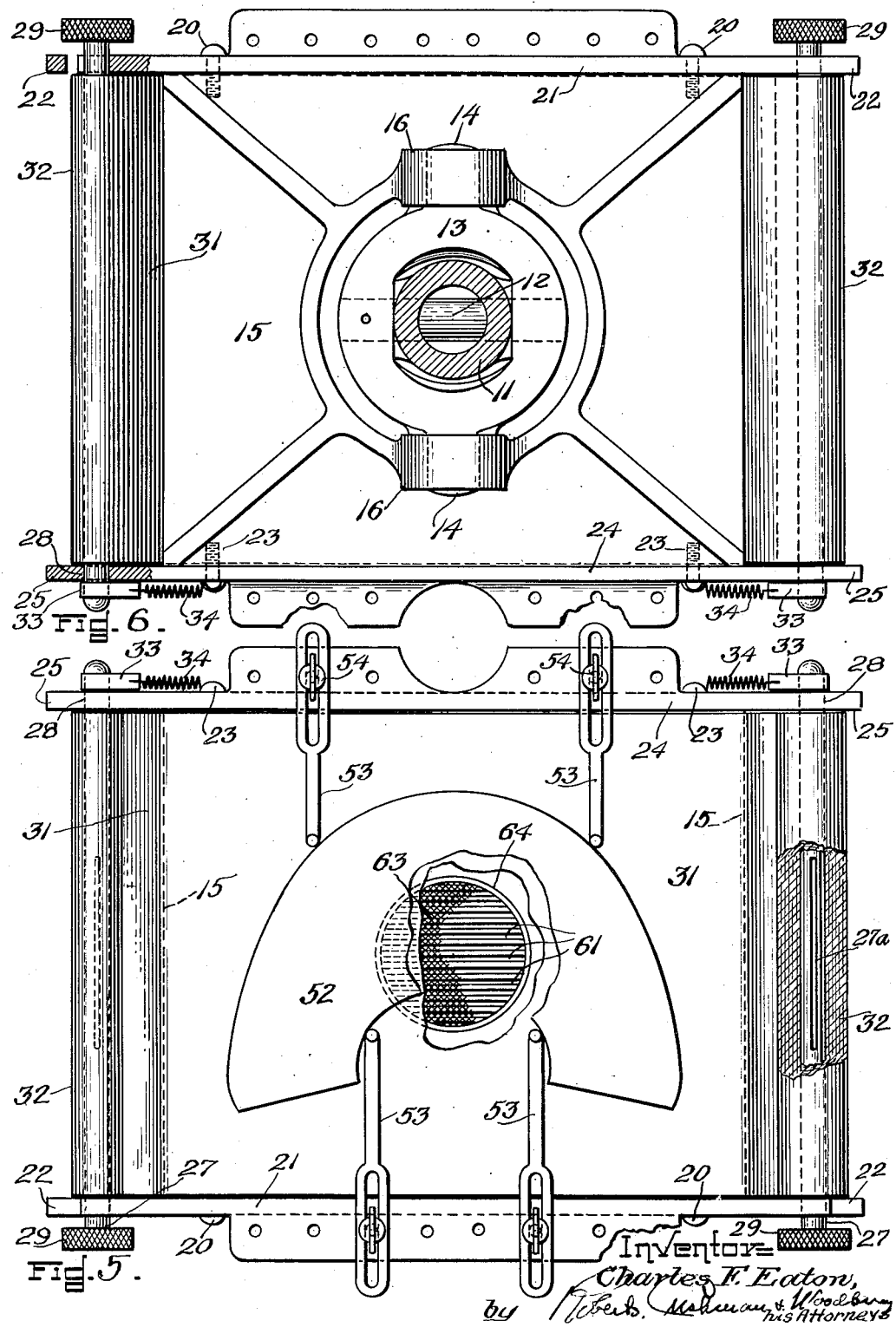

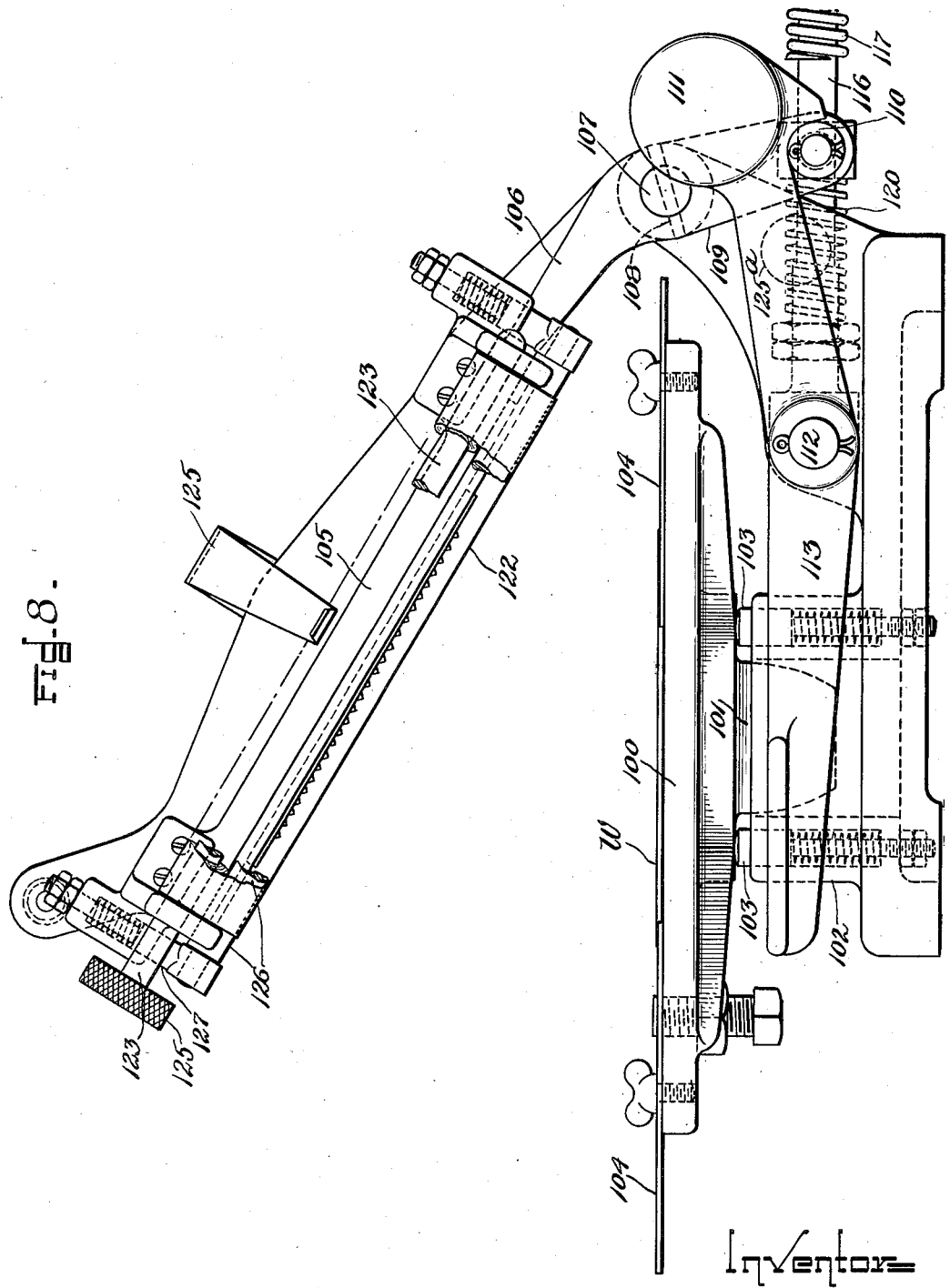

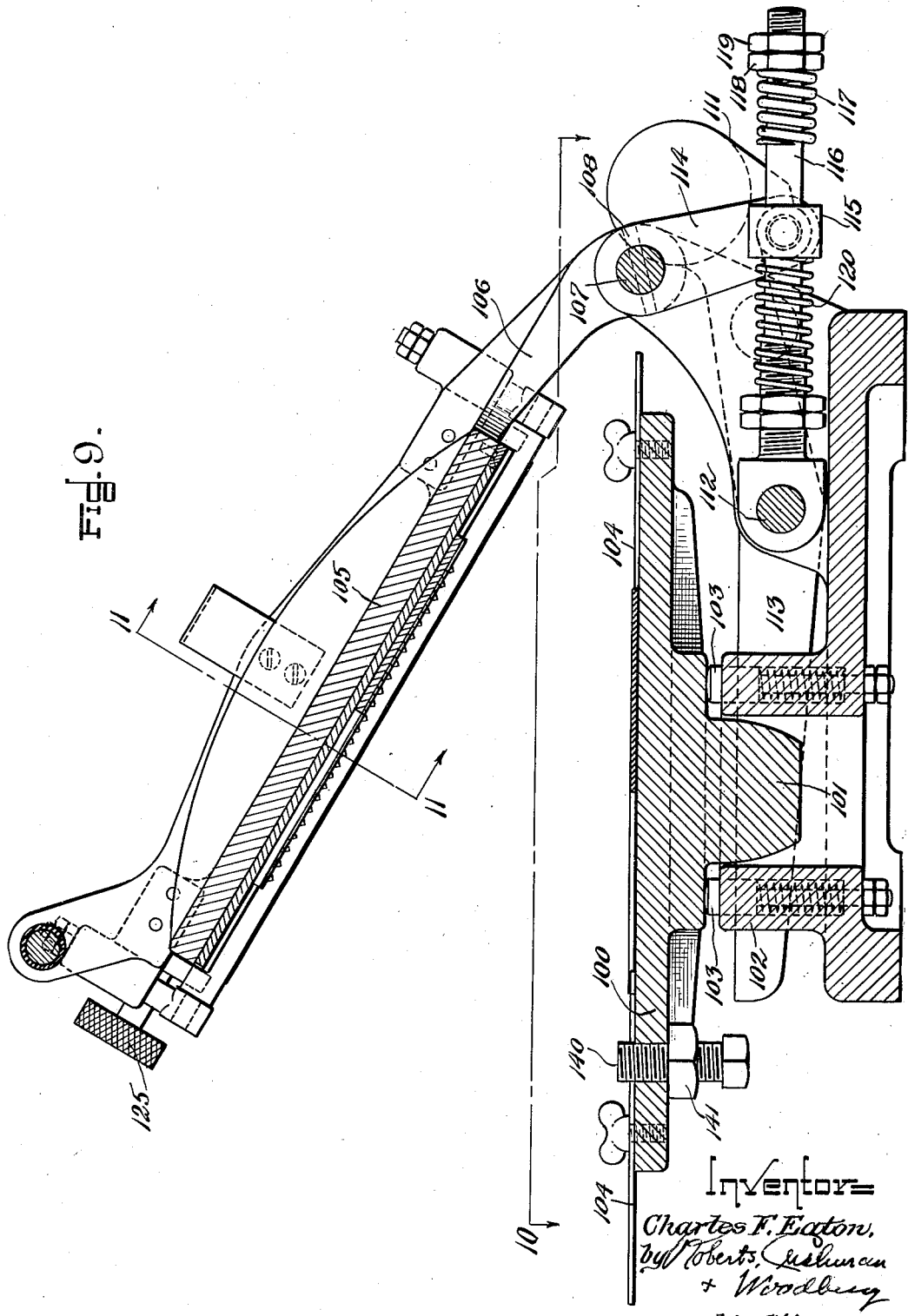

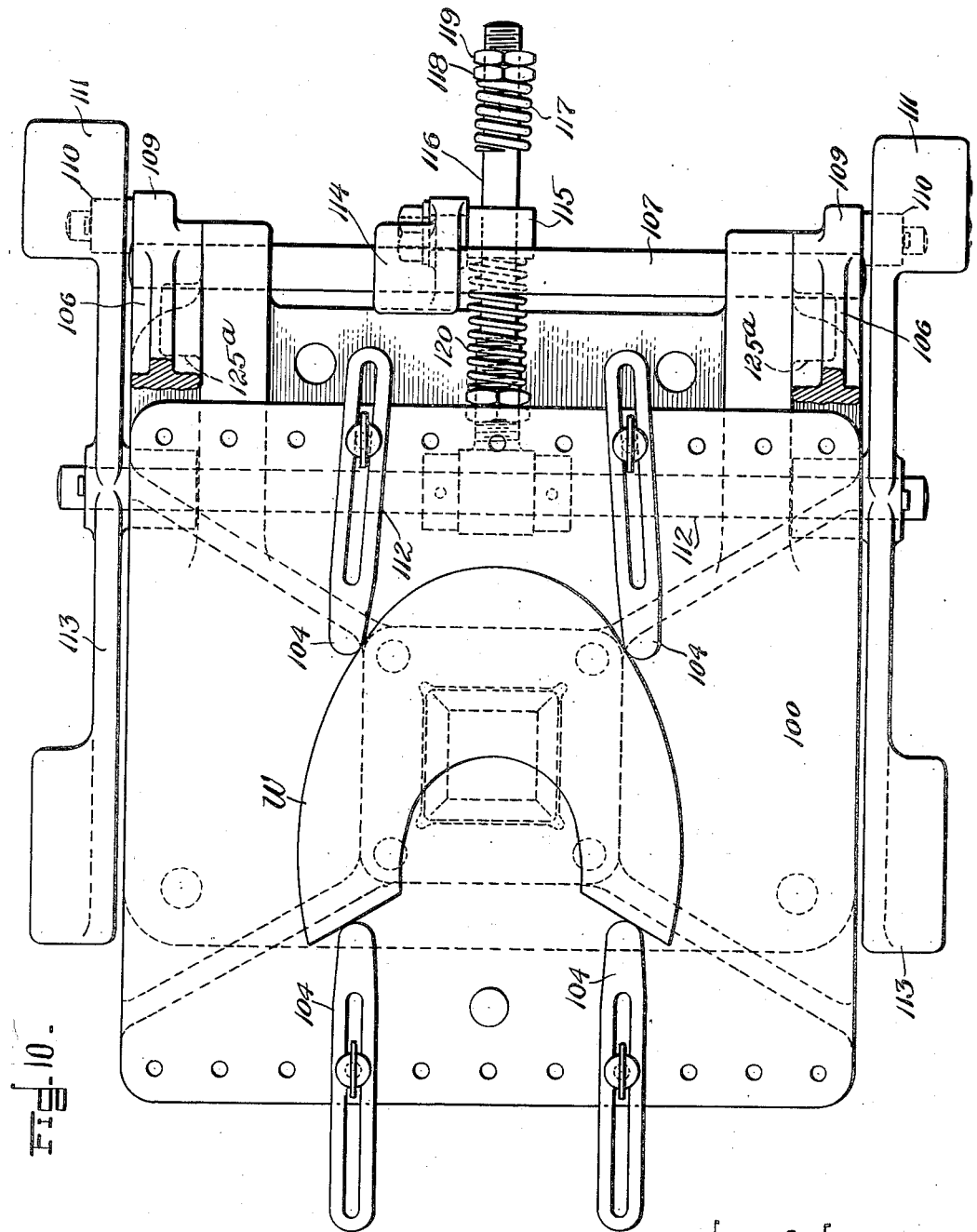

July 7, 1936.  C. F. EATON  2,046,872
MARKING MACHINE
Filed Jan. 6, 1934  8 Sheets-Sheet 8
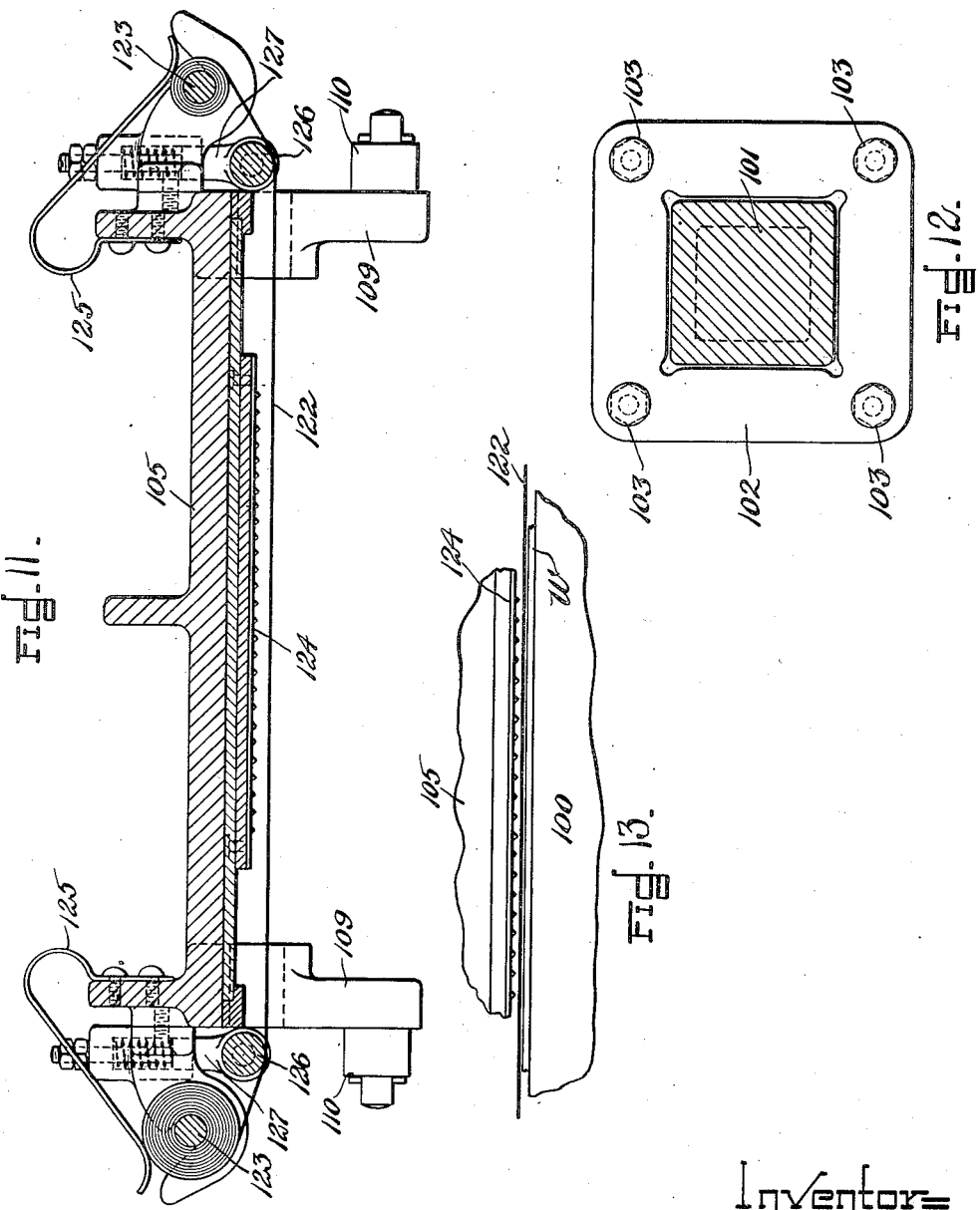
Inventor=
Charles F. Eaton,
by Trent, Cushman & Woodbury
his Attorneys Patented July 7, 1936

2,046,872

UNITED STATES PATENT OFFICE 2,046,872

MARKING MACHINE

Charles F. Eaton, West Newbury, Mass., assignor, by mesne assignments, of one-half to North American Holding Corporation, Syracuse, N. Y., a corporation of New York, and one-half to Parshad Holding Corporation, Syracuse, N. Y., a corporation of New York Application January 6, 1934, Serial No. 705,559

16 Claims. (Cl. 101—297)

This invention relates to machines for marking shoe upper sections and similar pieces or blanks of sheet material, and consists in certain improvements upon and modifications of the marking machine shown in my application for Letters Patent of the United States filed December 2, 1933, Serial No. 700,665.

Important features of the present invention reside in the gimbal joint support of the work-bed, by means of which the work-bed may be yieldingly rocked in any direction, and the use of air pressure to hold the transfer sheet and the stock on the work-bed when the platen or press member is raised.

These and other features will be hereinafter more fully described and particularly pointed out in the claims.

In the accompanying drawings,

Fig. 2 is a side elevation of the machine shown in Fig. 1;

Fig. 3 is a section on line 3—3 of Fig. 1;

Fig. 4 is a front elevation of the front or free end of the platen;

Fig. 5 is a top plan view of the work-bed showing a leather vamp in position thereon;

Fig. 6 is a bottom plan view of said work-bed;

Fig. 7 is an edge view of a removable pad hereinafter described;

Fig. 8 is a side elevation, partly broken away, of another embodiment of the invention;

Fig. 9 is a vertical section from front to rear through the machine shown in Fig. 8;

Fig. 10 is a plan view in section on line 10—10 of Fig. 9;

Fig. 11 is a section on line 11—11 of Fig. 9;

Fig. 12 is a detail showing a plan view of the work-bed support in the machine of Fig. 8; and Fig. 13 is a detail showing the relation of the embossing plate, the transfer sheet and the blank at one stage of the operation.

Figure 1:
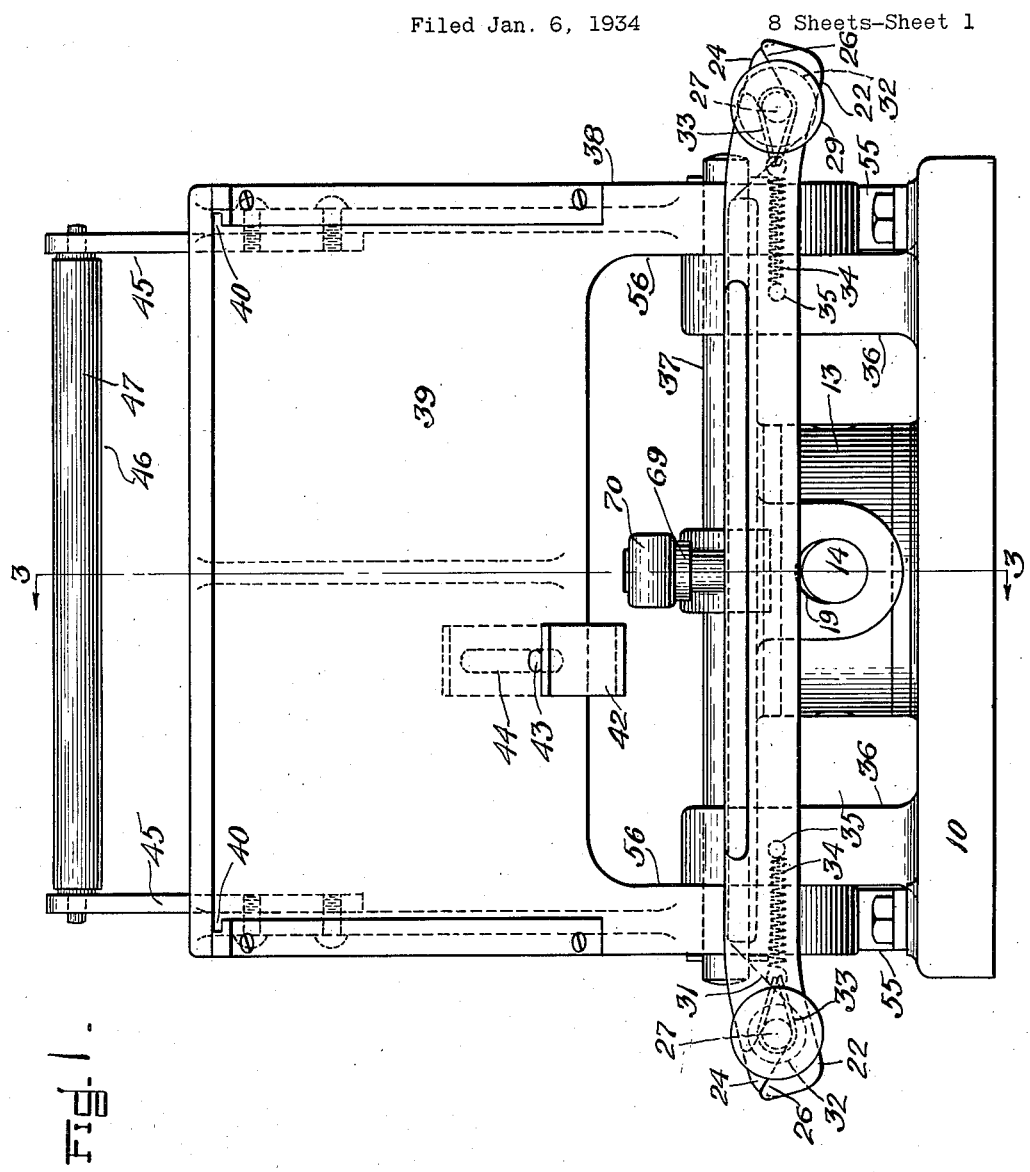
Fig. 1 is a front elevation of a marking machine embodying the invention.

Referring first to the form of machine shown in Figs. 1 to 6, the base 10 of the machine is adapted to rest upon a bench or other suitable support. Rising from the base 10 is an upstanding tubular post 11 formed with opposite aligned circular apertures within which is mounted a transverse pintle 12. The two ends of pintle 12 project beyond the post 11 and occupy holes provided in opposite sides of a ring 13 (Figs. 1, 3 and 6) which is pivotally supported by axially aligned trunnions 14 arranged at right angles to the axis of pintle 12. The trunnions 14 pivotally support the work-bed 15 which is made with a pair of downwardly extending lugs 16 having holes 19 within which the trunnions 14 are loosely mounted.

The annular space between ring 13 and base 10 is filled by a ring 17 of resilient material such as rubber, and the similar annular space between ring 13 and the bottom of the work-bed 15 is filled with another ring 18 of rubber or other resilient material.

Thus, the work-bed 15 is pivotally supported on the base to rock universally on two horizontal axes at right angles to each other, forming in effect a gimbal joint, and the resilient rings 17 and 18 normally hold the work-bed in a substantially horizontal position but will yield to permit a slight rocking movement of the work-bed in any direction when pressure is applied during the marking operation. As indicated in Figs. 1 and 3 the holes 19 which receive the trunnions 14 are slightly elongated in a vertical direction so that the bed 15 can yield downwardly somewhat under pressure from above.

Fastened to the front side of the work-bed 15 by means of screws 20 is a bar 21 which extends at each end beyond the work-bed 15 so as to provide projecting arms 22. Another bar 24 is fastened to the rear side of work-bed 15 by screws 23 and the ends of this bar also extend beyond the work-bed to provide projecting arms 25 horizontally opposite the projecting arms 22. Each arm 22 is formed upon its top side with an obliquely disposed socket 26 (Fig. 1) within which is rotatably supported one end of a spindle 27. Each arm 25 is formed with a circular hole 28 aligned with the bottom of the socket 26 in the corresponding arm at the front of the machine. The rear end of each spindle 27 is rotatably mounted in one of the holes 28. Each spindle 27 is provided at its front end with a hand wheel or knob 29 by means of which it may be manually rotated. Each spindle 27 is also formed near its middle with a longitudinal slot 27ª (Fig. 5) which extends through the spindle and is designed to receive one end of a transfer sheet 31.

The transfer sheet 31 may be made of any usual or suitable thin sheet material such as paper or fabric impregnated or coated with a transferable pigment which is preferably of a color to contrast with the color of the leather or other sheet material to be marked. With the transfer sheet 31 attached at each end to one of the spindles 27 the rotation of one of the spindles will wind the transfer sheet thereon in a roll as indicated at 32 in Fig. 1. The transfer sheet 31 extends from the roll 32 on one spindle across the top of the work-bed 15 to the roll 32 on the other spindle and is supported directly upon the flat working surface of the work-bed 15. By rotating one spindle 27 or the other the transfer sheet may be adjusted and shifted back and forth across the work-bed to bring fresh surfaces of the transfer sheet into operating position as required. In order to hold the spindles against accidental rotative displacement during the use of the machine a friction brake 33 is provided for each spindle. Each friction brake as herein illustrated comprises a flexible band of leather or other friction material looped around the end of spindle 27. The ends of the band are brought together and connected by a coil spring 34 attached at 35 to the adjacent bar 24. Each spring 34 is under sufficient tension to hold the brake band 33 in frictional engagement with the end of the spindle. The arms 22 and 25, besides supporting the spindles, serve as guides for the transfer sheet 31 as the sheet is shifted back and forth across the work-bed 15. When the transfer sheet 31 becomes worn out or exhausted it may be wound entirely on one of the spindles 27 and then by lifting the front end of the spindle from its socket 26 the rear end of the spindle may be pulled endwise of its hole 28 and its brake band 33.

The base 10 is made at its rear side with two upwardly extending arms 36 (Fig. 1) in which are journaled the ends of a horizontally disposed pivot pintle 37, whose axis is parallel with the axis of pintle 12 and in approximately the same horizontal plane with the top face of work-bed 15. Fixed to the pintle 37 is the platen 38, which comprises a body plate 39 of generally rectangular shape and of approximately the same size and shape as the top of the work-bed 15 with which it registers when the platen 38 is swung downwardly during the marking operation. The body plate 39 of the platen has a smooth flat bottom surface, at opposite sides of which are a pair of guideways 40. The embossing plate is carried by a base plate 41 (Fig. 3) which may be slid in and out of the guideways 40, the rear edge of the base plate abutting against a stop 42, herein shown as a bail-shaped member adjustably fastened to the platen by means of a clamping screw 43. The stop member 42 is made with a slot through which the screw 43 extends as indicated by dotted lines in Fig. 1 so that the stop members 42 may be adjusted as found necessary for properly positioning the removable embossing plate.

Secured to the top of the platen 38 are two upwardly and forwardly extending bracket arms 45 whose free ends are made with circular holes, within which are rotatably mounted trunnions at the ends of the handle 46. The handle 46 may be made of a metal core whose ends form the trunnions and a covering 47 of tubular rubber or other suitable material.

The embossing device, as herein illustrated, includes the base plate 41, an intermediate bolster plate 48 and the embossing plate proper 49 (Fig. 3), these three plates being fastened together by eyelets or rivets 50. The embossing plate 49 is made, as usual, of sheet metal on which are formed, as by stamping, a number of small, generally conical projections 51 arranged in lines or groups to delineate the design which is to be marked on the shoe upper section 52 (Fig. 5) or other blank of sheet material.

The blank 52 is placed upon the transfer sheet 31, which in turn rests upon the work-bed 15, with its skin side or finished side lowermost and in contact with the transfer sheet, and is accurately positioned thereon, according to the size and shape of the blank, by means of the guides or gauges 53 which are adjusted by set screws 54 on horizontal flanges projecting from the sides of the bars 21 and 24.

After the blank 52 has been properly placed in position on top of the transfer sheet 31 so as to register with the embossing plate, the platen 38 is manually swung downward until the embossing plate 49 strikes against the upper side of blank 52 thereby forcing the marking projections 51 into the blank 52 and forming therein indentations, the under sides of which are forced against the transfer sheet and the design corresponding to the arrangement of the marking projections 51 is marked on the under side of the blank.

When the platen is thus swung down on its pivot against the blank the work-bed 15 will tend to rock slightly on its universal joint support thereby causing a slight lateral displacement of the work-bed and transfer sheet with relation to the under surface of the blank. This results in a slight creeping movement between the transfer sheet and the blank to be marked which assists in effecting a clear transfer of the pigment from the transfer sheet to the blank.

After the marking operation has been performed by the downward movement of the platen as just described, the platen may be manually returned to its normal elevated position and is there yieldingly held by two leaf springs 55 (Figs. 1, 2 and 3). The platen 38 is made with two cam-shaped hubs 56 against each of which bears the free end of one of the springs 55. Each hub 56 is formed with a shoulder 57 which abuts against the free end of the spring to limit the upward movement of the platen arm. Each cam hub 56 is made with a flat zone 58 against which the leaf spring 55 fits flatwise to support the platen yieldingly in its elevated position. Each cam hub also has a curved zone 59 concentric with the axis of pintle 37. The curved or arcuate zone 59 is farther from the axis of the pintle 37 than the flat zone 58. Therefore, when the platen 38 is swung downwardly the leaf springs 55 will be flexed downwardly until the curved zone 59 comes into position against the springs, after which the downward movement of the platen 38 will continue uninfluenced by the springs 55 except for the slight frictional engagement of the springs with the hub. Thus, the initial downward movement of the platen 38 is yieldingly resisted by the two springs 55 which yieldingly hold the platen aloft; but the latter part of the stroke of the platen is substantially free of the resistance of the springs 55 and is wholly under the control of the operator through the handle 47 by which the operator may regulate the force of the marking blow according to his judgment.

When the platen 38 starts to swing upwardly after the marking operation the blank 52 tends to stick to the projections 51 of the embossing plate and the transfer sheet 31 also tends to stick to the blank 52. There is thus a tendency for the platen 38 to pull the transfer sheet up and away from the work-bed. To counteract this tendency pneumatic means are provided for holding the transfer sheet in position on the work-bed by air pressure when the platen is moved away from the work-bed. Referring to Figs. 3 and 5 the work-bed 15 is provided with an aperture or series of apertures, herein shown as slots 61 separated by cross bars. These apertures open into a closed chamber defined by the rings 13, 17 and 18 and this chamber is in turn in communication with the interior of the tubular hub 11. Instead of the slots 61, perforations of any form might be used provided the perforated or foraminate area is such as to provide adequate support for the transfer sheet. If the apertures are too large the transfer sheet, which has very slight self-sustaining capacity, will tend to sag or bulge into the apertures. By making the apertures small enough, the foraminate area of the work-bed itself may be used to support the transfer sheet; but it is preferable to make the apertures in the work-bed of reasonably large size and cover them with a foraminate sheet having much smaller perforations. For this purpose the top surface of the work-bed 15 is slightly recessed in the area of the slots 61 and the recessed area is preferably surrounded by an annular groove 62. A sheet of foraminate material, such as fine mesh woven wire fabric or perforated sheet material 63 is placed in the recess over the apertures 61, the recess being only sufficient in depth to bring the exposed or top surface of the foraminate sheet 63 substantially flush with the surface of the rest of the bed-plate. The foraminate sheet 63 may be held in position in any suitable way, as by moulding or bending its periphery into an annular flange which is secured in the groove 62 by means of a ring 64.

The interior of the tubular post 11 opens into one end of a conduit 65 formed in the base 10. The other end of the conduit 65 communicates with the lower end of an exhaust pump cylinder 66 containing a piston 67. Within the cylinder 66 is a coil spring 68 which rests at its lower end on the cylinder head and abuts at its upper end against the piston 67. The piston 67 is made with an upwardly extending stem 69 which is pressed and held by spring 68 against the end of an arm 70 fixed to the pivoted spindle 37 of the platen 38. The base 10 is also provided with a port 71, the inner end of which communicates with the conduit 65 and the outer end of which is controlled by a gravity operated check valve 72.

When the platen 38 is swung downwardly for the marking stroke the arm 70 acts through stem 69 to push the piston 67 downwardly in the cylinder. During this downward movement the air in the cylinder and conduit displaced by the piston is discharged through port 71 past the check valve 72. When the platen 38 is swung upwardly after the marking operation the arm 70 rises and the piston 67 is forced upwardly by the spring 68, thereby exhausting air through the apertures 61 and conduit 65, the check valve 72 being held closed by gravity and air pressure. The transfer sheet 31 will therefore be held firmly by atmospheric air pressure against the foraminate sheet 63 covering the apertures 61. Thus the transfer sheet will be pneumatically held against being pulled up away from the work-bed when the platen is raised. A small vent 73 may be provided at the lower end of the cylinder 66 to permit the piston 67 to rise under the influence of spring 68 during the air exhausting stroke. When the piston reaches the limit of its upward movement it uncovers large vent ports 74, positioned near the top of the cylinder, to equalize the air pressure within and without the cylinder.

The piston spring 68 also acts in whole or in part to counterbalance the weight of the platen 38.

Instead of mounting the embossing plate on the platen as shown in Fig. 3, it may be removed and the pad structure shown in Fig. 7 may be substituted. The base plate 41, like the base plate to which the embossing plate is attached, is adapted to slide in and out of the guideways 40 on the platen. Secured to the bottom face of the base plate 41 (Fig. 7) is a pad 60 of rubber or other suitable material. In using this structure the gauges 53 are dispensed with, the blank 52 is laid on the transfer sheet as before, an unmounted or unattached embossing plate like 49 is laid on the blank with its edges registering with the edges of the blank and then the platen carrying the pad 60 is swung down on the parts thus assembled to perform the marking operation.

Referring now to the modifications shown in Figs. 8 to 12, the work-bed 100 is provided upon its under side with a depending central boss 101, which is of generally pyramidal form and has four slightly convexed sides. The boss 101 extends into the open top of a tubular or socket-like post 102 on the base of the machine to hold the work-bed in position on the base while permitting it to rock slightly in any direction. The work-bed is supported on four spring-pressed plungers 103 mounted in sockets in the top of post 102 so that the work-bed is yieldingly held level but is free both to move downwardly and to rock universally in any direction under the pressure of the platen. A number of work-positioning guides or gauges 104, similar to guides 53 in the other form of machine, are adjustably fixed to the top of the work-bed by means of set screws.

The platen 105 is provided at opposite sides of its rear edge with rearwardly extending lugs or arms 106 made with holes to receive the pintle rod 107 to which the arms are rigidly fastened by means of pins 108. The pintle rod 107 is journaled in bearings provided on the base frame of the machine. Each lug 106 is made with a downwardly extending arm 109, which carries a roll 110 at its lower end. The roll 110 cooperates with the nose of a latch 111. Each latch 111 is weighted and is loosely pivoted on a cross rod 112. Each latch 111 is also made with a forwardly extending operating arm 113 positioned at the side of work-bed 100.

Near the middle of the pintle rod 107 is fixed a depending arm 114 (Fig. 10), to the lower end of which is swiveled a sleeve or collar 115. The collar 115 slides on a rod 116, which is pivotally mounted to swing on cross rod 112. A buffer spring 117 is carried by rod 116, and abuts at one end against a nut 118, adjustably screwed on the free end of rod 116 and locked in adjusted position by means of a lock nut 119. The buffer spring cushions the end of the marking stroke of the platen.

When the platen 105 is in elevated position it is supported in that position by the latches 111, one at each side of the machine. If the forward arms 113 of both latches are depressed the platen is released and swings downwardly by gravity, assisted if desired by a spring 120, which bears at one end against the collar 115 and at its other end against a nut on rod 116. The buffer spring 117 is so adjusted on rod 116 as to regulate the force of the blow struck by the platen on the work W to secure the proper degree of force to produce the desired intensity of marking.

It is a feature of safety of this form of the invention that the platen 105 can not be operated to swing down on the work-bed unless both latch arms 113 are simultaneously depressed. Since these arms are at opposite sides of the machine the operator must use both hands to operate the two arms 113 at the same time, and it is therefore practically impossible for the descending platen to catch his hand between the platen and the work-bed.

In this form of machine the transfer sheet 122 is carried by the platen 105, instead of by the work-bed, and is connected to two spindles 123 journaled in bearings at opposite sides of the platen. The transfer sheet extends from one spindle to the other, across the under face of the platen and underneath the embossing plate 124, which is removably carried by the platen. Brake springs 125 fixed to the platen yieldingly press against the rolls of transfer sheet on spindles 123 and hold the spindles against accidental rotative displacement. The transfer sheet may be manually fed or adjusted by means of handles 125 on spindles 123. By turning one of the handles 125 after a marking operation not only is the transfer sheet shifted to present a new surface for the next operation, but if the transfer sheet sticks to the embossing plate 122 after a marking operation, as sometimes happens, the manual adjustment of the transfer sheet will disengage the sheet from the embossing plate. The active stretch of the transfer sheet between the spindles is normally spaced a short distance below the embossing plate, as best shown in Figs. 8 and 11, by rollers 126, carried by spring pressed plungers 127 mounted on the platen 105. At the moment of making the marking blow the transfer sheet yields and moves back against the embossing plate. Fig. 13 shows the relative positions of the work-bed 100, the work W, the transfer sheet 122, the embossing plate 124 and the platen 105 just as the platen is about to close down on the work during the marking stroke.

The buffer spring 117 may be dispensed with, but it is desirable when the weight of the platen is such as to strike too violent a blow unless checked. The spring 120 may also be dispensed with if the weight of the platen alone is sufficient to insure a marking stroke of the desired force.

The adjustable stop screw 140 (Fig. 9) mounted on the work-bed 100 limits the downward movement of the platen and prevents the embossing plate from striking the work-bed in case no work is on the work-bed. In normal operation it will usually not function, although it might be so adjusted as to control the depths of the impression on the blank.

I claim:

1. A marking machine comprising a base, a work-bed pivotally supported on the base to rock thereon in any direction, a movable platen mounted on the base to move downwardly into marking relation to the work-bed and upwardly away from the work-bed, means urging said platen to swing downwardly against said work-bed, and a pair of manually releasable latch members disposed one on each side of said work-bed, each of said latch members being operative to hold the platen in elevated position, said platen being operative to swing downwardly against said work-bed only upon the simultaneous release of said latch members.

2. A marking machine comprising a base, a work-bed pivotally supported on the base to rock thereon in any direction, means yieldingly to hold the work-bed in a substantially horizontal position, a movable platen mounted on the base to move downwardly into marking relation to the work-bed and upwardly away from the work-bed, means urging said platen to swing downwardly against said work-bed, and a pair of latch members disposed one on each side of said work-bed and each operative to hold the platen in elevated position, said platen being operative to swing downwardly against said work-bed only upon the simultaneous release of said latch members.

3. A marking machine comprising a base, a work-bed pivotally supported on the base to rock thereon in any direction, means yieldingly to hold the work-bed in a substantially horizontal position, a platen pivotally supported on the base on an axis approximately parallel and coincident with the normal plane of the face of the platen, means urging said platen to swing downwardly against said work-bed, and a pair of latch members disposed one on each side of said work-bed and each operative to hold the platen in elevated position, said platen being operative to swing downwardly against said work-bed only upon the simultaneous release of said latch members.

4. A marking machine comprising a base, a work-bed pivotally supported on the base to rock on two horizontal axes at right angles to each other, means yieldingly to hold the work-bed in a substantially horizontal position, a platen pivotally supported on the base on an axis substantially parallel with one of the two axes of the work-bed, means urging said platen to swing downwardly against said work-bed, and a pair of latch members disposed one on each side of said work-bed and each operative to hold the platen in elevated position, said platen being operative to swing downwardly against said work-bed only upon the simultaneous release of said latch members.

5. A marking machine comprising a base, a work-bed pivotally supported on the base to rock on two horizontal axes at right angles to each other, means yieldingly to hold the work-bed in a substantially horizontal position, a platen pivotally supported on the base on an axis approximately parallel and coincident with the normal plane of the face of the platen and substantially parallel with one of the two axes of the work-bed, means urging said platen to swing downwardly against said work-bed, and a pair of latch members disposed one on each side of said work-bed and each operative to hold the platen in elevated position, said platen being operative to swing downwardly against said work-bed only upon the simultaneous release of said latch members.

6. A marking machine comprising two press members relatively movable one toward and away from the other, one of said press members having an aperture through its working surface, a conduit communicating with said aperture, and means associated with one of said members and operative in response to the movement of one press member away from the other to exhaust air through said aperture and conduit.

7. A marking machine comprising a work-bed, a platen movable toward and from the work-bed, a transfer sheet supported upon the work-bed, and pneumatic means associated with said platen and operative to hold the transfer sheet in position on the work-bed by air pressure when the platen is moved away from the work-bed.

8. A marking machine comprising a work-bed, a platen movable toward and from the work-bed, said work-bed having an aperture opening through its working surface, a conduit communicating with said aperture, and means associated with said platen and operative in response to the movement of the platen away from the work-bed to exhaust air through said aperture and conduit.

9. A marking machine comprising a work-bed, a platen movable toward and from the work-bed, the working surface of said work-bed having a foraminate area capable of supporting a sheet, a conduit communicating with the apertures of said foraminate area, and means associated with said platen and operative in response to the movement of the platen away from the work-bed to exhaust air through said apertures and conduit.

10. A marking machine comprising a work-bed, a platen movable toward and from the work-bed, the working surface of said work-bed having a flat foraminate area capable of supporting a sheet, a pair of spindles rotatably mounted on the work-bed, one at each edge thereof, a transfer sheet having its opposite ends connected to said spindles and extending across the work-bed between said spindles and directly supported by the work-bed, a conduit communicating with the apertures of said foraminate area, and means controlled by the movement of the platen away from the work-bed to exhaust air through said apertures and conduit.

11. A marking machine comprising a work-bed, a platen movable toward and from the work-bed, the working face of said work-bed being provided with a number of apertures, a sheet of foraminate material covering said apertures, a transfer sheet supported by said foraminate sheet, a conduit communicating with said apertures, and means to exhaust air through said foraminate sheet, said apertures and said conduit.

12. A marking machine comprising a work-bed, a platen movable toward and from the work-bed, the working surface of said work-bed being provided with a number of apertures, a sheet of foraminate material covering said apertures, the apertured area of the work-bed being recessed and the foraminate sheet being disposed in the recess with its exposed side substantially flush with the surrounding surface of the work-bed, a transfer sheet supported by said foraminate sheet, a conduit communicating with said apertures, and means to exhaust air through said foraminate sheet, said apertures and said conduit.

13. A marking machine comprising a base, a work-bed supported on the base, a platen pivoted on the base to swing toward and from the work-bed, and a manually releasable latch on each side of said work-bed operative to hold the platen in open or elevated position, said platen being operative to swing downwardly against said work-bed only upon the simultaneous release of each latch.

14. A marking machine comprising two press members relatively movable one toward and away from the other and pneumatic means associated with one of said members and operative to hold a sheet in position against one of said press members in response to relative movement of said press members away from each other.

15. A marking machine comprising two press members relatively movable one toward and away from the other, one of said press members having an aperture through its working surface, a conduit communicating with said aperture, and means associated with one of said members and operative in response to relative movement of said press members away from each other to exhaust air through said aperture and conduit.

16. A marking machine comprising a work-bed, a platen movable toward and from the work-bed, and pneumatic means associated with said platen and operative in response to movement of said platen away from said work-bed to hold a sheet in position on the work-bed by air pressure when the platen is moved away from the work-bed.

CHARLES F. EATON.